Patented June 5, 1934

1,961,908

UNITED STATES PATENT OFFICE 1,961,908

METHOD OF ATTACHING SURFACES BY RUBBER

Albert L. Murray, Auburn, Ind.

No Drawing. Application April 25, 1932,
Serial No. 607,488

2 Claims. (Cl. 154—40)

The invention relates to improvements in the method of forming attaching surfaces on shoe soles, heels and the like and it utilizes certain features set forth in my previous Patents No. 1,577,349 issued March 16, 1926, for Processes for securing rubber to leather and like materials, No. 1,624,500 issued April 12, 1927, for Composite rubber soles and in my Patent No. 1,630,445 issued May 31, 1927 for Shoe bottoms.

As a result of my said inventions and the economy of the product, soles for shoes attached by these methods are now widely used, the sales being several million pairs per year. In the use and application of the article, specific and different conditions have arisen which have necessitated new methods, based on partial use of the above inventions, combined with certain new steps necessary to produce the desired result in each case.

One such specific condition is the application of soles to new shoes in shoe factories and for the better class of repair work where, as described in said previous patents, it is desired to use a raw rubber sheet or film between the parts to be joined because of its ability to absorb the flexing strain and thus permit a building or repairing of the shoe without sewing or nails and with the result of a more flexible shoe bottom and one made waterproof by this intermediate rubber sheet. Since in such applications it is highly necessary to obtain the greatest adhesion possible and one of such extreme durability as to withstand all kinds of hard use throughout the life of the shoe, it becomes desirable to increase the comparatively tender nature of raw rubber and to do away with its tendency to soften somewhat in hot weather by changing it into the materially stronger condition obtained by vulcanization.

Ordinary vulcanizing of the rubber sheet or film is impractical because the necessary high heat and the considerable length of time during which the rubber must be under such heat in order to bring about vulcanization will damage or destroy leather. What is known as a vapor cure cannot be used because the vapor cannot reach the raw rubber since the rubber is sealed between contacting surfaces and also because such vapor would damage the finish of the shoe upper. What is generally known as acid curing, while it has seemed to promise results, has been found impractical by the very nature of its three essentials the first essential of acid curing as it has heretofore been conceived has been the applying of the solution to the rubber in an extremely wet condition such as slopping it on, this being necessary in order that the article can be handled before evaporation occurs and because immediately thereafter a glaze is formed which prevents any possibility of a union. This wet condition is impractical in applying soles to finished shoes because of the solution running over the sides and damaging the uppers. Extreme quickness in getting the surfaces together (generally in less than ten seconds) is also essential to the ordinary acid cure and is impractical in the shoe application because some pains must be taken in placing the soles correctly and the slightest delay or misjudgment on the part of the workmen would result in some parts not being pressed and held down quick enough and therefore being unjoined by reason of a glaze having formed thereon, and thereby producing defective products. The third essential of wet acid cure is the immediate placing of the parts under pressure. This again is rendered difficult to handle on shoes because the surfaces when wet with the solution are extremely slippery making it very difficult to hold the sole to the somewhat rounding shape of the shoe bottom in proper alinement therewith and with a strong probability of it slipping out of place when pressure is applied.

By careful test work and study I have evolved what I designate a semi-dry acid cure method which method I believe to be new and novel and which successfully overcomes all the above difficulties and which can be used successfully without putting the shoe in a pressure machine although such pressure machines can be used as an added security where available.

My semi-dry acid cure method consists of using a rather large brush for the supplying of the acid, in order that, after the liquid is worked out of the brush, it will retain a moderate dampness for a considerable length of time, thus enabling me to apply quite a number of soles before the acid dampness is exhausted. In place of applying the acid in the usual wet manner, I remove as much of the acid as possible from the brush by squeezing it out against the sides of the container. I then still further remove the acid by working the brush on absorbent material, such as a block of paper, and when it appears to only dampen the paper without material wetness, I rapidly and deeply work the acid into my cemented surfaces, by working the brush over the same, with the object of mixing a small amount of acid so thoroughly into the raw rubber deposited by the cement, that instead of causing said surface to be wet or slippery, I simply bring it up to a decidedly tacky or sticky condition. The fact of the acid solution having become embodied into the raw rubber and thus forming practically a rubber cement, means that the high percentage of rubber, which has become mixed with the small percentage of the solution and its acid self-curing agents, greatly delays evaporation and affords liberal time to apply the soles as carefully as desired. Due to this semi-dry, sticky or tacky condition which holds the parts together when they come in contact, very successful results and a perfect acid cure are obtained simply by pressing the sole on the shoe with the hand, then hammering it a little to tighten the union and possibly pinching it tight around the edge with a pair of pincers prepared for that purpose. A few short nails, can of course be used, at the toe and also in the case of half-soles, at the instep if desired for extreme security, such as on hard-used children's shoes, or heavy work shoes, but they are not usually necessary.

This semi-dry curing method gives a separation test of the full strength of vulcanized rubber and a strength that does not vary noticeably under temperature changes. The cured rubber being of a pure nature is still materially softer than either leather or the harder kinds of rubber used in soles and it is also highly elastic so that it absorbs the flexing strains perfectly.

My semi-dry acid cure method is equally adapted to the curing of cement alone as well as to the above described combination of an intermediate sheet of rubber and is also equally adapted whether the materials to be joined consist of leather or rubber or any combination of the two or of the joining of any other materials to which rubber or rubber cement in any form will adhere. The sheet or film of raw rubber may be calendered or spread or otherwise applied to either one of the materials to be joined or it may be calendered or spread or otherwise applied to holland cloth or any protective material and then applied as a separate sheet.

Because of the small amount of solution required in my semi-dry acid cure process I am enabled to use a materially stronger solution, such as one having two or three times the normal strength. However, the strength of the acid may be adjusted according to the depth of the raw rubber desired to be cured and the results desired.

While I have described principally the application of my semi-dry acid cure method to the applying of shoe soles it is of course valuable for many other applications where it is desired to cure rubber without heat; and even where the ordinary acid cure could be used I believe this semi-dry process is superior because of the much greater time it allows and because of the immediate and perfect seal caused by the surfaces being tacky instead of slippery and thus inclined to immediately hold tightly to each other. It should be understood that where the conditions are such that there is nothing to prevent the use of curing agents compounded within what I have termed my raw rubber cement or raw rubber sheet then the presence of such curing agents does not change the value of my semi-dry acid cure method. It will cure the rubber by its own curing action or will convert a compound containing curing agents into cured rubber.

I am aware that acid has been applied to rubber by merely brushing over the rubber with a brush containing curing acid. Such brushing in no way effects my purpose and neither will many repetitions of the brushing unless sufficient pressure is exerted on the brush to force the acid into the surface of the rubber. Any light brushing such as has been heretofore used is in direct opposition to my method which requires that the acid be worked into the rubber. It is, therefore, to be understood that the term "working" as used in the appended claims is to be taken as applying the acid with such pressure that it will be forcibly mixed with the surface rubber of the sheet or mass being treated.

What I claim is:

1. The process of preparing rubber having an unvulcanized face for vulcanization to a surface, which is characterized by rubbing or brushing the unvulcanized surface with a vulcanizing agent and a rubber solvent, the solvent and agent being held in the brush against freely flowing from the brush, the brush being only moistened or dampened by the vulcanizing agent and solvent.

2. The process of preparing rubber having an unvulcanized face for vulcanization of said face to a surface consisting in dipping a brush into a solution of a rubber solvent and a vulcanizing agent, working out of the brush the vulcanizing agent and solvent until the brush is merely dampened with the vulcanizing agent and solvent and not free flowing, then brushing the unvulcanized surface with the damp brush and working the solvent and agent well into the surface to render it tacky.

ALBERT L. MURRAY.